United States Patent [19]

Meuschke et al.

[11] Patent Number: 5,069,863
[45] Date of Patent: Dec. 3, 1991

[54] DUAL WINCH NUCLEAR FUEL TRANSFER SYSTEM PROVIDING MORE RELIABLE FUEL TRANSFER DURING REFUELING OPERATIONS

[75] Inventors: Robert E. Meuschke; Mark J. Harper, both of Murrysville; David J. Stefko, Penn Township, Westmoreland County, all of Pa.

[73] Assignee: Westinghouse Electric Corp., Pittsburgh, Pa.

[21] Appl. No.: 377,875

[22] Filed: Jul. 10, 1989

[51] Int. Cl.$^5$ ............................................. G21C 19/20
[52] U.S. Cl. .................................. 376/270; 104/183; 254/387; 414/146
[58] Field of Search .................... 376/270, 264, 261; 104/183, 162, 173.1, 176, 178; 254/387; 414/146

[56] References Cited

U.S. PATENT DOCUMENTS

| | | | |
|---|---|---|---|
| 3,260,384 | 7/1966 | Lemesle et al. | 414/146 |
| 3,437,315 | 4/1969 | McDonald, Jr. | 104/183 |
| 3,637,096 | 12/1972 | Crate | 414/146 |
| 3,987,735 | 10/1976 | Lofink | 104/183 |
| 4,069,766 | 1/1978 | Bernstein | 376/264 |
| 4,725,398 | 2/1988 | Ruckey et al. | 376/270 |

*Primary Examiner*—Daniel D. Wasil
*Attorney, Agent, or Firm*—M. G. Panian

[57] ABSTRACT

A transfer system moves fuel assemblies along a track extending through a transfer tube within a containment wall in a nuclear power plant between the auxiliary building side and the containment building side. A car carries a basket for the assemblies. Two winches are located on the auxiliary building side above the water level existing over the track during refueling operations. The winches operate respective pairs of cables, driving the car in either direction. Four sheaves respectively direct the cables to the horizontal direction along the track. One pair of cables is secured to a yoke on the car to drive the car away from the containment building. Two horizontal sheaves are located near the containment end of the transfer tube. The other two cables extend horizontally along the track from the vertical sheaves to the horizontal sheaves, redirecting them to extend horizontally in the reverse direction. These return cables are secured to the yoke to drive the car toward the containment building. The winches are operated under the control of a programmable limit switch to move the car selectively between one end position in which the car is within the auxiliary building, and the other end position in which the car is principally within the containment building with at least the car yoke located over the track within the transfer tube and to the auxiliary building side of the horizontal sheaves.

18 Claims, 15 Drawing Sheets

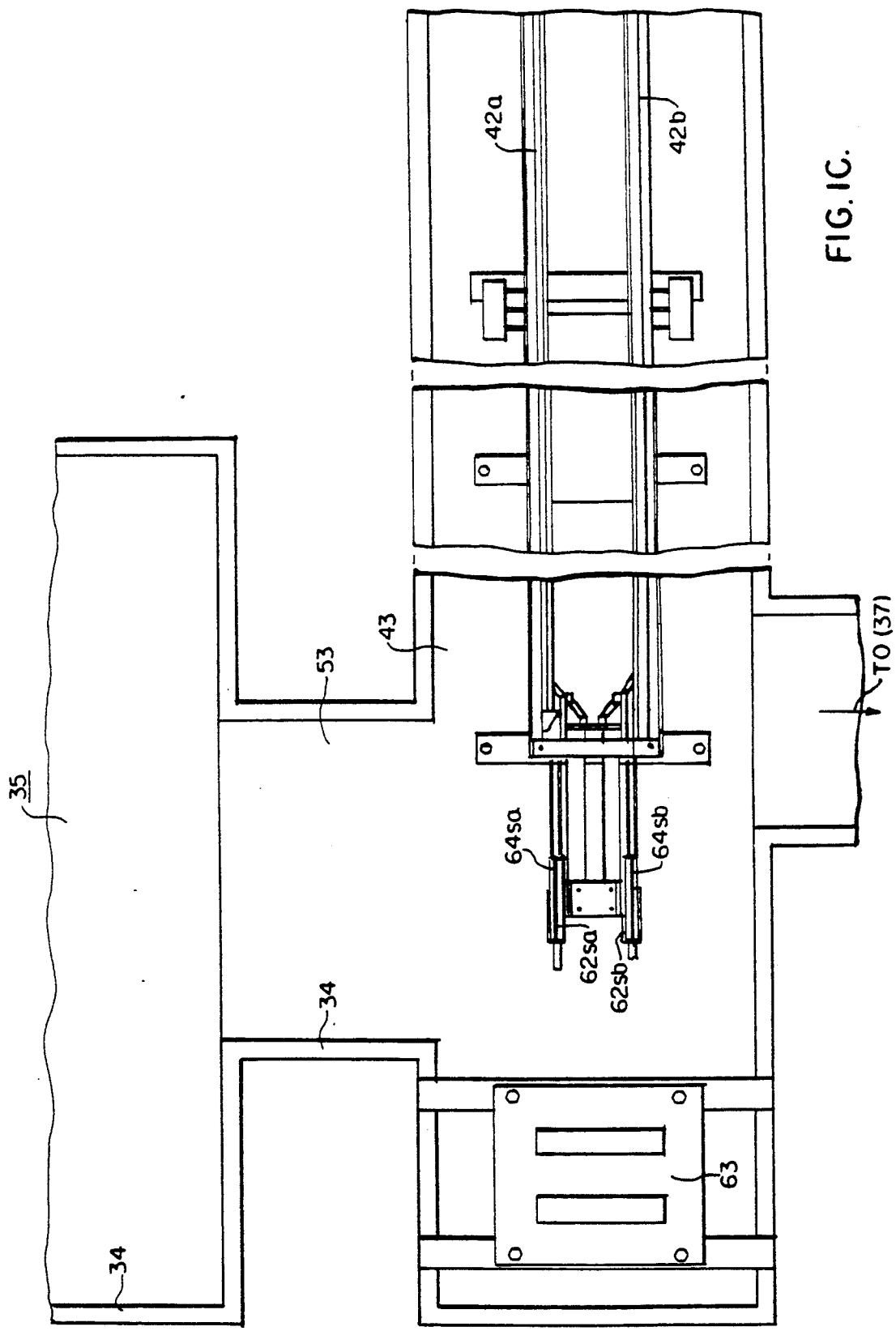
FIG. IC.

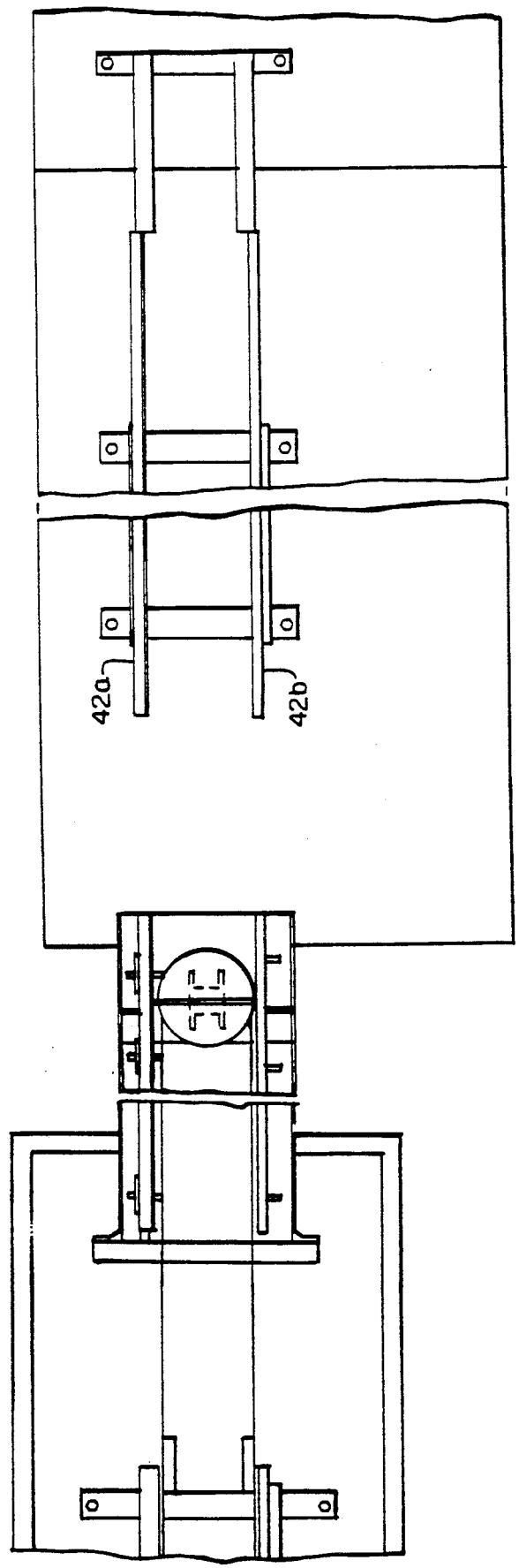
FIG.ID.

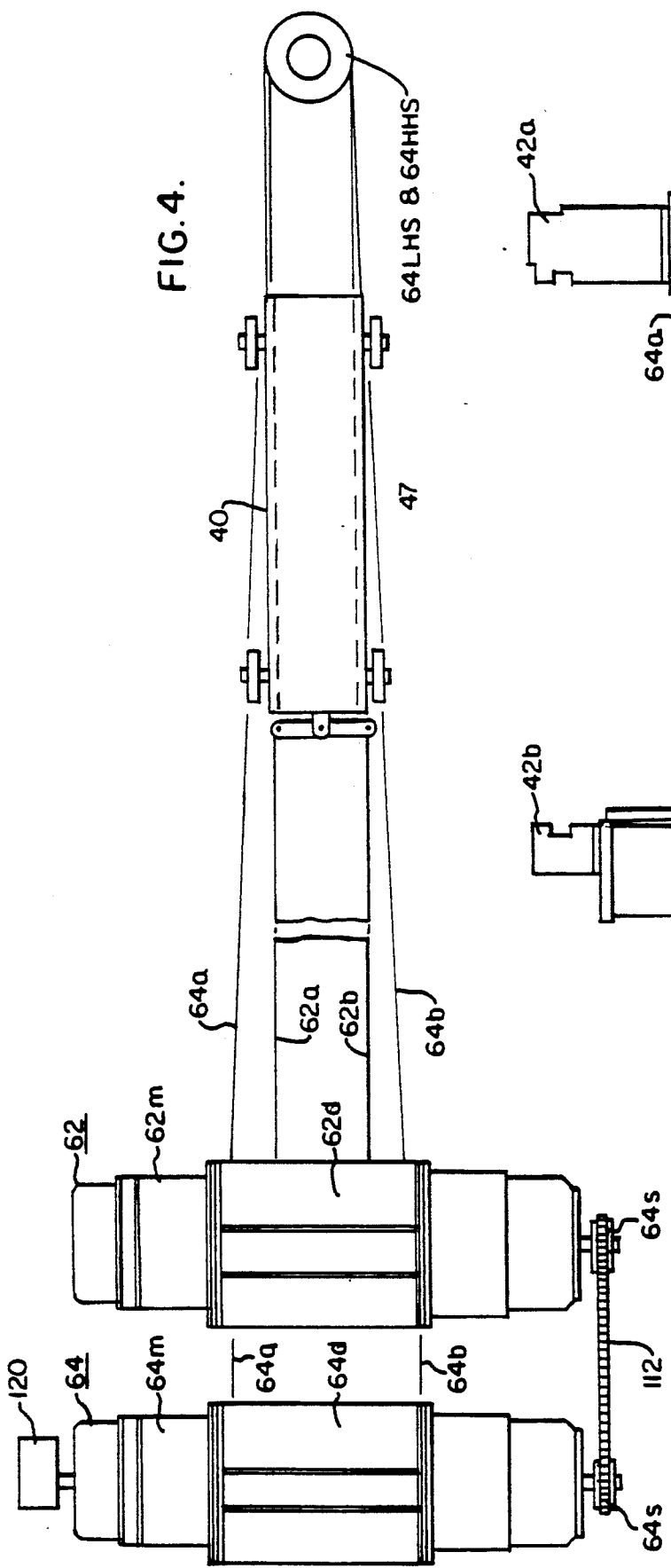

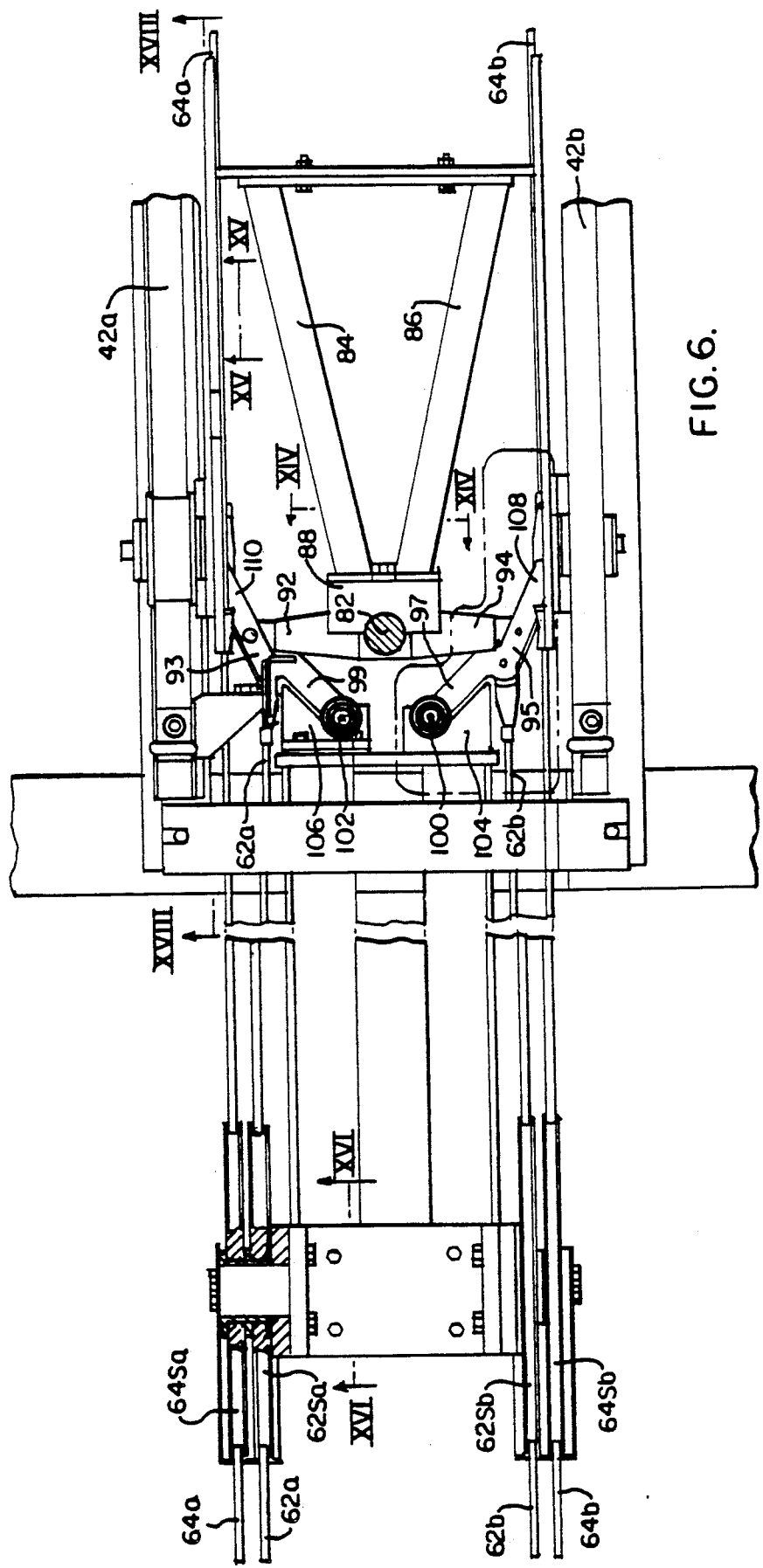

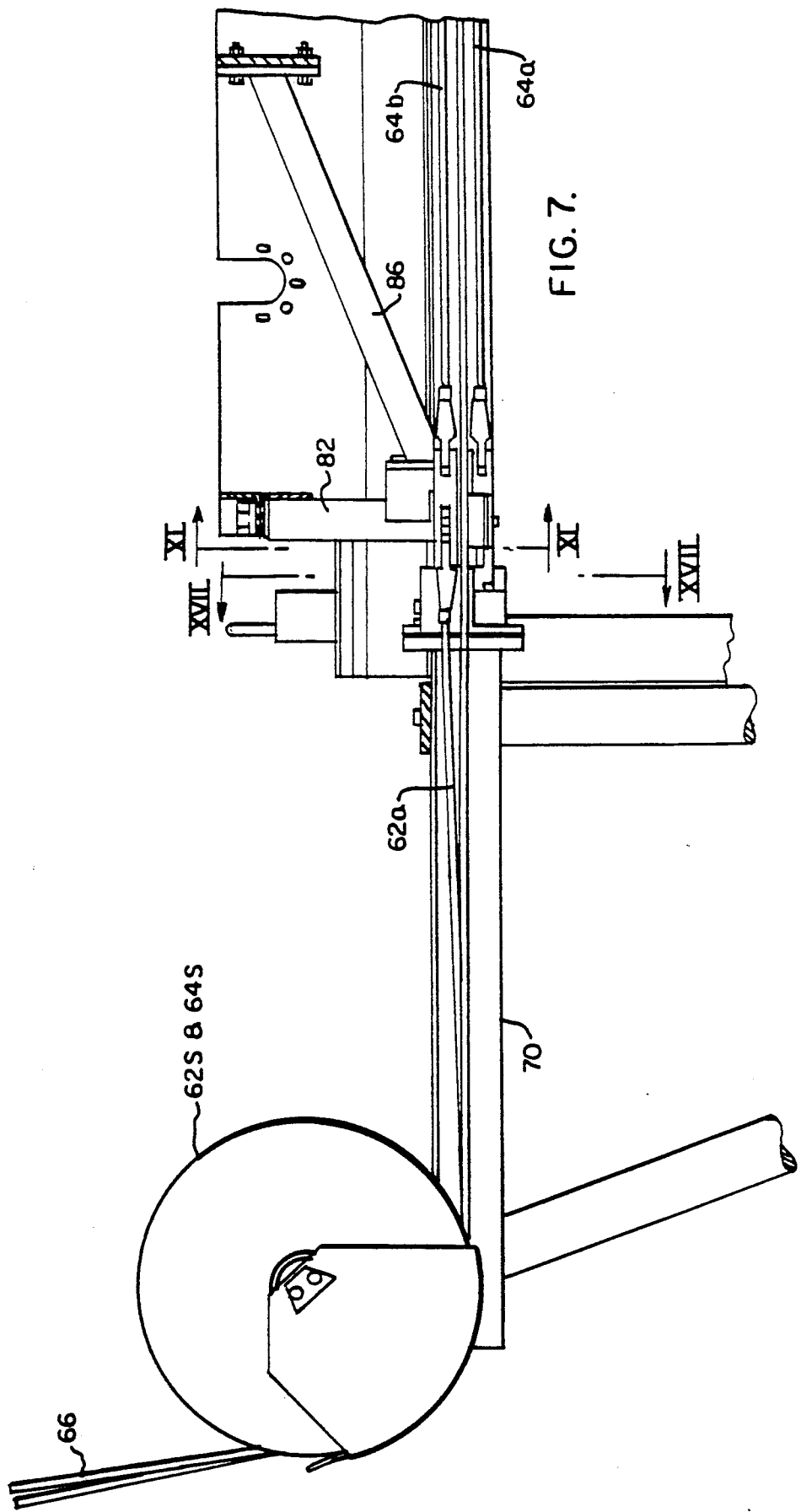

DUAL WINCH NUCLEAR FUEL TRANSFER SYSTEM PROVIDING MORE RELIABLE FUEL TRANSFER DURING REFUELING OPERATIONS

CROSS-REFERENCE TO RELATED APPLICATIONS

None.

BACKGROUND OF THE INVENTION

The present invention relates to nuclear power plants and more particularly to fuel transfer systems employed therein during refueling to transfer fuel assemblies between the containment building and the storage pool.

When a nuclear reactor is shut down for refueling, fully or partially spent fuel assemblies are lifted from the reactor core in the containment building and moved through a pool of water to a fuel transfer system that transfers the assemblies usually one or two at a time to the auxiliary building where other apparatus takes the assemblies and deposits them in the pool storage area. New fuel assemblies or partially spent assemblies are carried by the fuel transfer system from the storage pool area to the containment building where they are placed in the reactor core.

Generally, the fuel transfer operation takes place under water to limit radiation exposure. Nonetheless, it is desirable that the fuel transfer system be economic in manufacture and both effective and reliable in operation to provide the required fuel assembly transport performance.

Typically, a stainless steel tube having a diameter between 20 inches and 36 inches provides a horizontal transfer path between the containment building and the spent fuel storage area. A transfer car may operate on a pair of spaced rails over the transfer path.

A basket is provided on the car to carry the fuel assembly during transfer. The basket may be an end pivot type in which case the basket is turned on its end to an upright position above the car for loading and unloading a fuel assembly at each end of the car travel. In this case, the space below the car and between the rails can be occupied with system structure since the basket does not pass through the undercar space when it is turned to the vertical position.

The basket may also be a center pivot type and this is normally the preferred scheme since the fuel assemblies can be upended at both ends of car travel with reduced loading on the upending mechanism. However, the center pivot basket does require undercar clearance space for the basket half that moves under the car when the basket is turned to the vertical position.

Since the car must operate in both directions along the transfer path, it is necessary that the drive system for the car provide driving force in either of the two directions. Further, it is desirable that the drive system be structured so that it is reliable for underwater operation.

One drive system architecture is the bilateral type and it involves placing a drive unit on the containment side of the containment wall to provide pulling force that directs the car away from the storage area and toward the containment building. Another drive unit located near the storage area provides pulling force that directs the car away from the containment building and toward the storage area. The fact that a drive unit must be located on opposite sides of the containment wall in this scheme is disadvantageous from a service and maintenance standpoint since a cable hookup must be provided from the drive unit to the car from the containment side before the fuel transfer operation can be started after a plant shutdown.

Another drive system architecture is the unilateral type and it involves apparatus advantageously located only on the storage area side of the containment wall. The drive system is organized so that it provides drive force for directing the car in either direction over the fuel transfer path.

In one prior art bilateral scheme, a fixed chain is welded to the bottom of the car midway between the rails and it is driven in either direction by a sprocket which in turn is driven by an underwater air motor.

Another prior bilateral scheme involves a continuous chain that runs along the center of the track. It is linked to the car and directly driven by a drive shaft of an underwater motor or indirectly driven through a coupling by a drive shaft of an electric motor above the water level. Again, the basket is end pivoted. A variation on this scheme involves a pair of continuous chains located outside the rails so that a center pivoted basket may be employed.

A prior unilateral scheme involves use of a fixed drum in the storage area and a drum on the car interconnected by cable. The car drum is coupled through a sprocket that engages pins on the rails to propel the car in one direction or the other. When the cable is pulled in one direction, the car drum is turned in one direction to propel the car in one direction along the track. When the cable is pulled in the opposite direction, the car is pulled in the opposite track direction and the sprocket rewinds the cable on the car drum. A center pivoted basket is used, but this scheme suffers from unreliability from a number of sources including the pin and sprocket drive arrangement.

In all of these schemes, underwater limit switches are normally required for system operation to enable the car to be brought to a controlled stop at its ends of travel. System reliability is accordingly adversely affected because the underwater limit switches are prone to leak over time.

The present invention is directed to a fuel transfer system having its drive system located on one side of the containment wall, preferably externally of the containment building. The drive is preferably structured for a center-pivoted car basket and otherwise for fuel transfer operation with significantly improved reliability.

SUMMARY OF THE INVENTION

A fuel transfer system provides for moving fuel assemblies along a track running between the auxiliary building side and the containment building side of a containment wall in a nuclear power plant. The track extends through a transfer tube within the containment wall.

The system comprises a car having wheels for movement along spaced rails of the track and a carrying basket for one or more fuel assemblies. Winch means are located on the auxiliary building side of the containment wall and above the water level existing over the track during refueling operations to drive the car along the track.

First cable means and second cable means extend substantially vertically downward from the winch means to the track level. First sheave means direct the first and second cable means substantially in the horizontal direction along the track.

Means are provided for securing the first cable means to the car so that winch pulling force on the first cable means drives the car away from the containment building. Second sheave means are located near the containment end of the transfer tube. The second cable means extend substantially horizontally along the track from the first sheave means to the second sheave means where it is redirected to extend substantially horizontally in the reverse direction along the track.

Means are provided for securing the second cable means to the car so that winch pulling force on the second cable means drives the car toward the containment building. The winch means are operated to pull the cable means so as to move the car selectively between one end position in which the car is within the auxiliary building for fuel assembly loading and unloading and the other end position in which the car is principally located in the containment building with at least a cable securance portion of the car located over the track within the transfer tube and to the auxiliary building side of the second sheave means. Both of the cable securing means are located on the cable securance car portion.

BRIEF DESCRIPTION OF THE DRAWINGS

FIGS. 1A-1D show portions of a nuclear power plant having a fuel transfer system arrange in accordance with the invention;

FIGS. 3 and 4 show respective views, partially schematic, of the fuel transfer system of FIG. 1;

FIG. 6 shows an end view of the transfer track from reference plane G—G in FIG. 1A;

FIG. 6 shows a top plan view of a portion of the drive system and the transfer track at the auxiliary building end of car travel;

FIG. 7 shows an elevation view of the subject mater of FIG. 6;

DESCRIPTION OF THE PREFERRED EMBODIMENT

Nuclear Plant With Fuel Transfer System

Figure 1A:
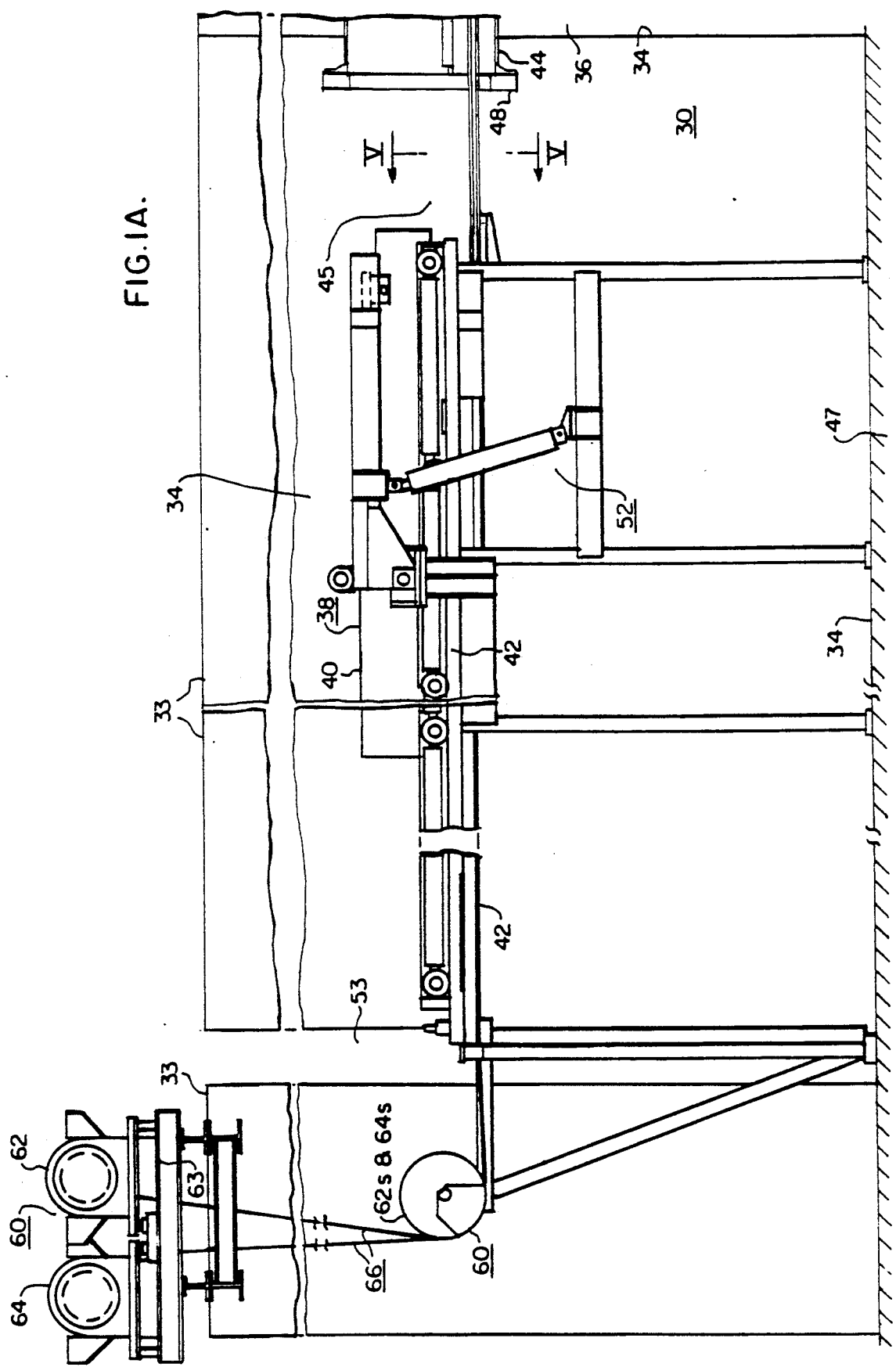

More particularly, there is shown in FIG. 1 a nuclear power plant 30, in this case a boiling water reactor plant, for which there are provided a containment building 32 for the reactor (not shown) and an auxiliary building 34 where pools 35 and 37 of water are located for fuel storage. A thick solid concrete containment wall 36 separates the containment and auxiliary buildings 32 and 34. An operating floor 33 extends across the two buildings 32 and 34 and the containment wall 36.

A fuel transfer system 38 includes a car 40 that operates on a track 42 having spaced rails 42A and 42B extending from a canal 43 within the auxiliary building 34 through a transfer tube 44 within the containment wall 36 into the containment building 32. The transfer tube 44 may be about fifteen feet long. Within the transfer tube 44, the rails 42A and 42B are bolted to supports 43C which in turn are welded to the transfer tube 44.

Respective gaps 45 and 47 exist in the car railing at the entry to the transfer tube 44 on both sides of the containment wall 36. However, the car 40 is provided with wheels that are appropriately located so that the car 40 bridges the rail gaps 45 and 47 when it moves along the track 42.

Isolation is provided for the containment building 32 by a hatch 46. An isolation valve 48 can be used to close off the transfer tube 44 from the auxiliary building 34.

A conventional upending mechanism 50 (FIG. 1B) in the containment building 32 is employed to turn a basket 51 pivotally supported by the car 40 into the vertical position where fuel transfer apparatus (not shown) can either take a fuel assembly (not shown) from the car basket 51 and install it in the fuel core or it can deposit a spent fuel assembly in the car basket 51 that had previously been obtained from the fuel core. When the car 40 is located at the containment end of the track 42, the leftmost end of the car 40 is located inside the transfer tube 44 thereby facilitating a structuring of a car drive system 60 for bidirectional operation from the auxiliary side of the containment wall 38. The containment building 32 is flooded during shutdown to reduce radiation exposure as fuel assemblies are relocated. In this boiling water reactor case, the containment building 32 is also flooded during normal reactor operation.

Another upending mechanism 52 (FIG. 1A) similarly upends the car basket 51 for fuel transfers to and from the storage pool in the auxiliary building 34. Another fuel transfer apparatus (not shown) located in the auxiliary building 34 handles these transfers through a gate area 53 (FIG. 1C) to the storage pool. The auxiliary building is also flooded to a level above the reactor vessel during fuel transfer operations so that the fuel assemblies are always handled at a water depth of 15 to 20 feet.

Fuel Transfer Drive System

The fuel transfer drive system 60 is preferably unilateral in the sense that it is located on one side of the containment wall 36, yet it is capable of providing bidirectional drive force for the car 40 even though the car 40 is largely located within the containment building 34 at the containment end of the car travel. In accordance with the invention, the drive system 60 operates the car 40 under water with significantly improved operating reliability, fuel transfer performance and manufacturing economy.

Preferably, the drive system 60 includes a pair of winches 62 and 64 (FIGS. 1A, 2A, 2B, 2D) supported on a plate 63 (FIG. 1C) above the track 42 at the leftmost end of the canal 43. Cabling 66 is coupled to the car 40 and operated by the winches 62 and 64 to drive the car 40 in one direction or the other direction over the track 42.

The winch 62 operates a pair of cables 62A and 62B (FIGS. 4 and 6) that extend vertically downward through slot 62S in the winch support plate 63 to the track level. Similarly, the winch 64 operates a pair of cables 64A and 64B that extend vertically downward through support plate slot 64S to the track level. Cable pairs are employed so that substantially equally applied drive forces can be applied to the two sides of the car 40 in each direction of travel.

The cables 62A and 62B are connected to the car 40 to pull the car 40 in the leftward direction as the winch 62 reels in the cables 62A and 62B. The cables 64A and 64B are connected to the car 40 to pull the car 40 in the rightward direction as the winch 64 reels in the cables 64A and 64B. The winches 62 and 64 are coordinated in operation in accordance with the invention so that desired cable tension is substantially continuously maintained as one or the other of the two winches operates as a master drive to reel in cable as the slave winch pays out cable.

At the track level, four vertical sheaves 62S and 64S (FIGS. 1A, 6 and 7) are used to redirect the vertical cabling from the winches 62 and 64 to the horizontal direction along the track 42. Generally, the cables 62A and 64A pass over the sheaves 62SA and 64SA which are located within but toward one side of the track and thereafter extend along that side of the track for securance to the underside of the car 40. Similarly, the cables 62B and 64B pass over the sheaves 62SB and 64SB which are located within but toward the other side of the track and thereafter extend along the other side of the track for securance to the underside of the car 40.

The cables 64A and 64B pass over the two outermost vertical sheaves 64SA and 64SB to facilitate placing them more closely toward the track rails since they extend along the track 42 to the containment end of the transfer tube 44 where they are directed in the reverse direction to extend back to the car 40 for securance thereto. The spacing between the cables 64A and 64B within the track 42 and to the containment side of the transfer tube 44 is generally sufficient to enable use of a center pivoted car basket without drive cable interference. In some embodiments, however, as in the present one, it may be desirable to provide special cable spreading action to facilitate car basket operation as subsequently described more fully herein.

Figure 10:
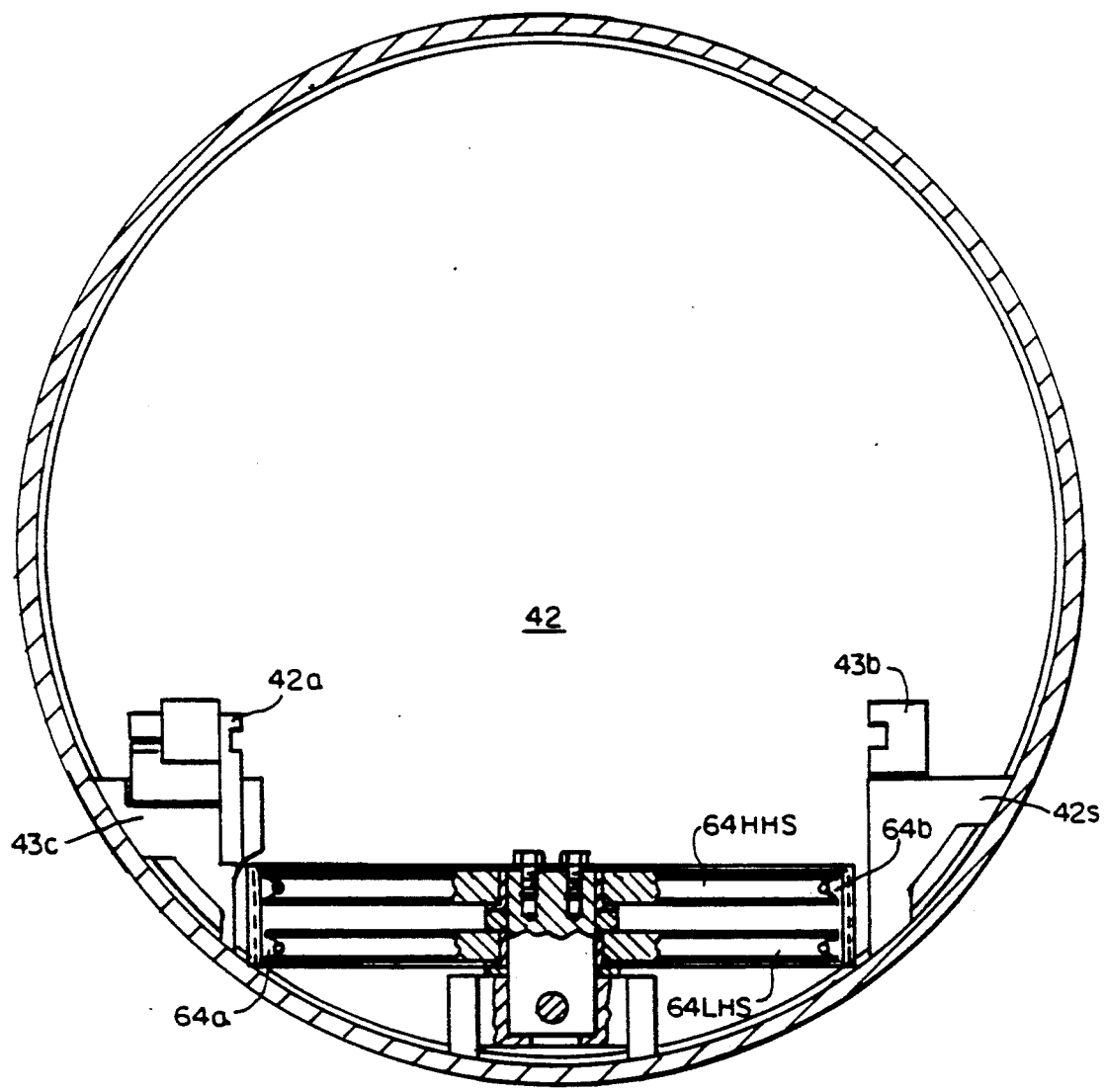
FIG. 10 shows a cross section of the system along a reference plane through the transfer tube.

The cables 62A and 62B are secured to the underside of the car 40 to provide leftward drive force for the car 40. The cables 64A and 64B extend to the rightmost end of the track within the transfer tube 44 and return in the opposite direction for securance to the underside of the car 40 to provide rightward drive force for the car 40. A pair of horizontal sheaves 64LHS and 64HHS (FIGS. 8 and 10) are located at the containment end of the transfer tube 44 to redirect the cables 64A and 64B in the reverse direction for securance to the underside of the car 40.

In operation, the winch 62 takes up the cables 62A and 62B to pull the car 40 toward the left and at the same time the winch 64 pays out the cables 64A and 64B to follow the leftward car movement. The opposite cable action occurs for rightward car movement.

Figure 8:
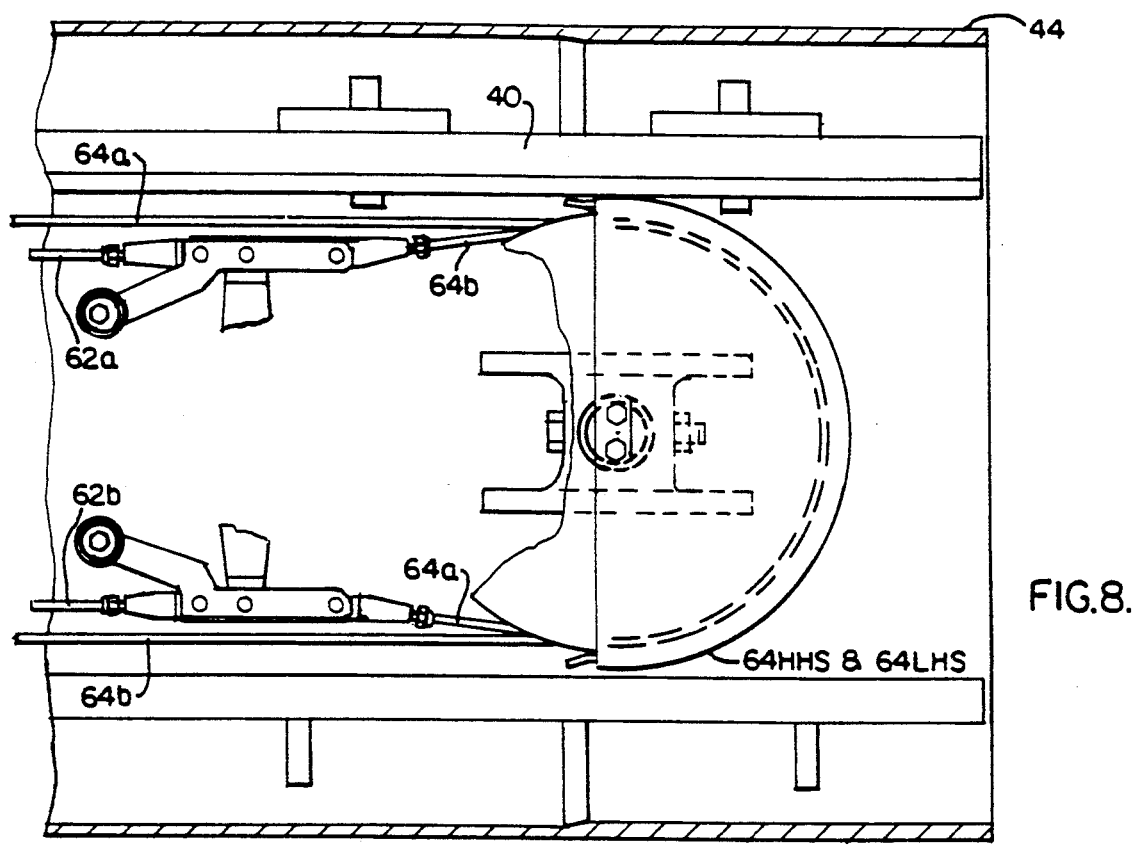
FIGS. 8 and 9 show top and side elevation views of the track at the containment end of a transfer tube through which the track passes.
Figure 9:
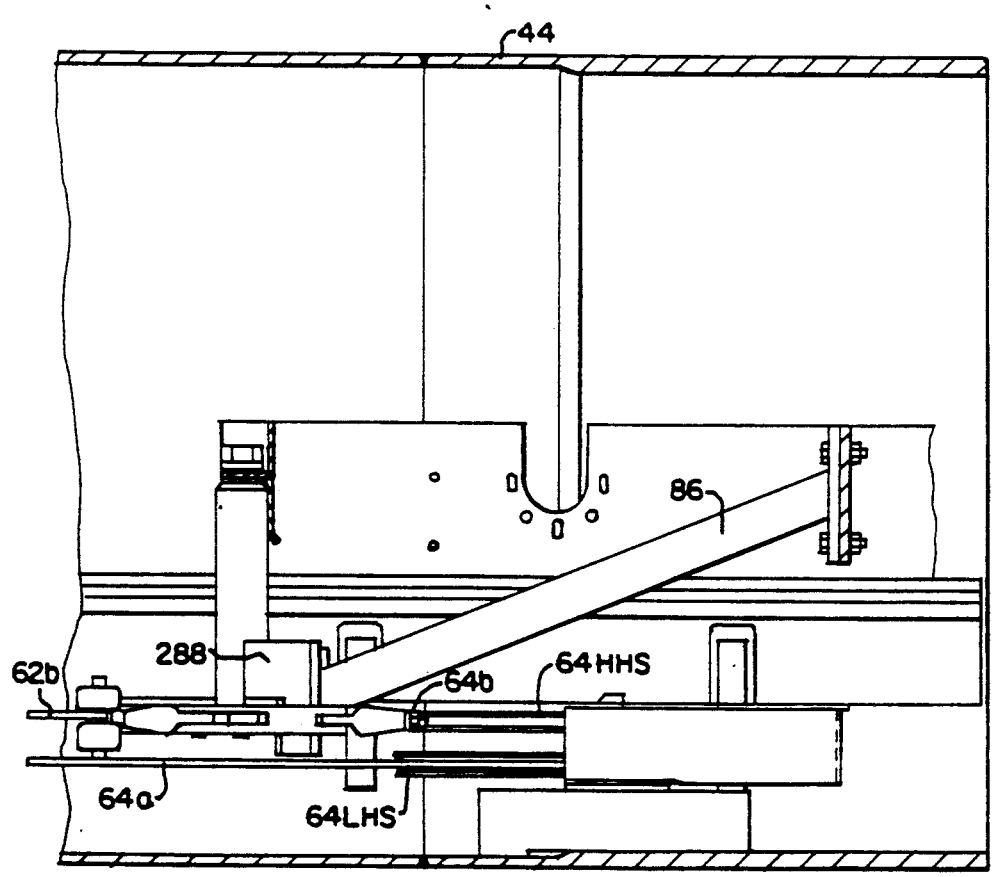
Figure 11:
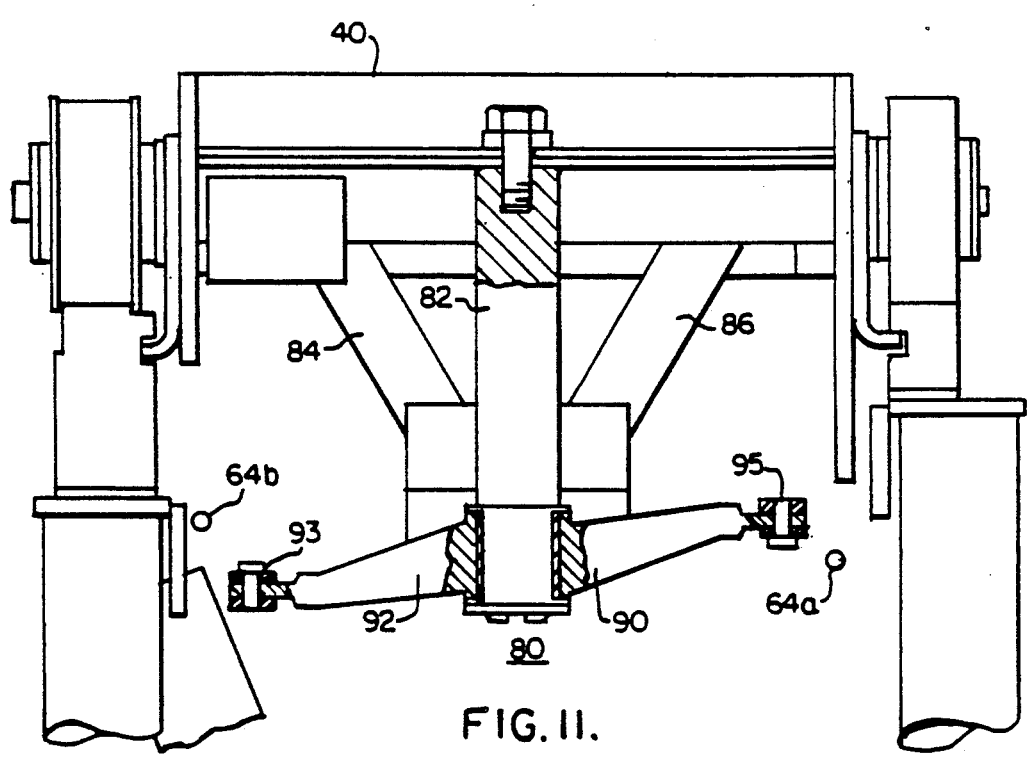
Figure 14:
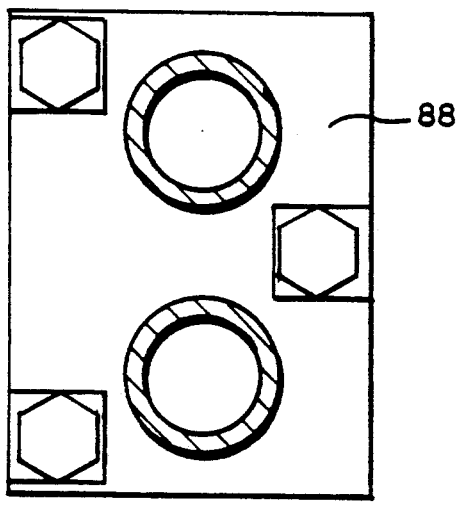
FIGS. 14-18 show various additional views of structural portions of the system as designated.
Figure 15:
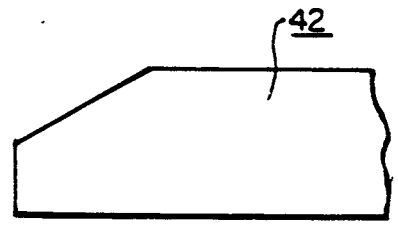
Figure 16:
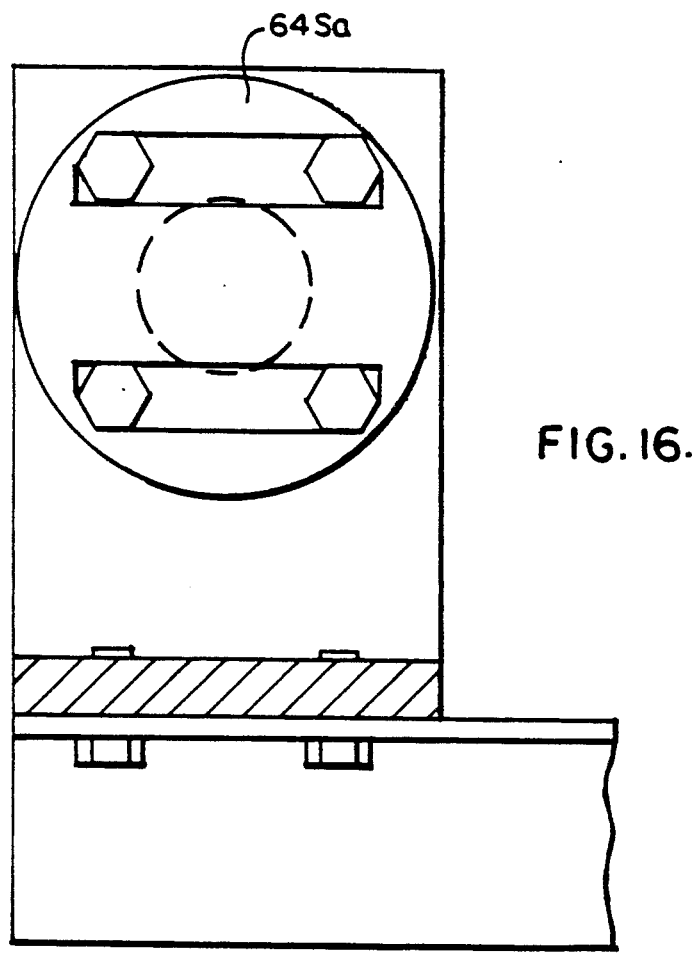
Figure 17:
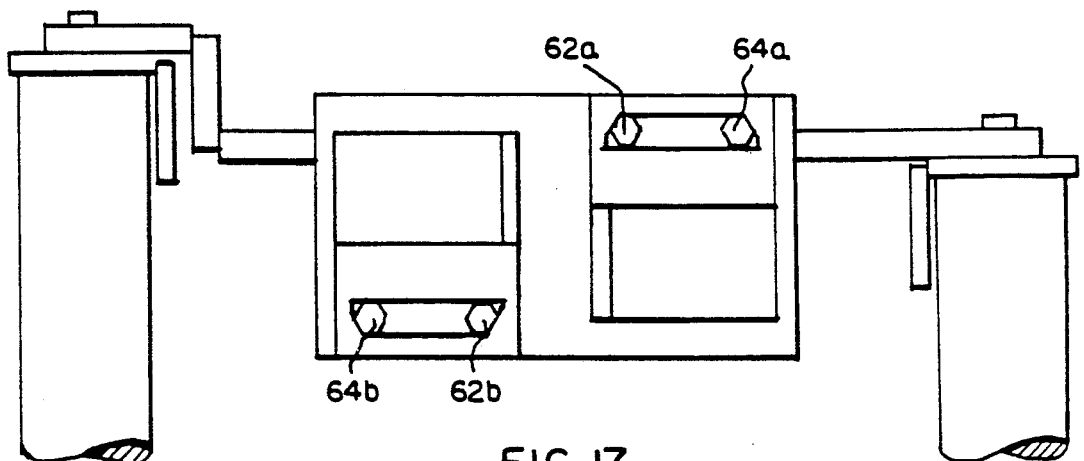
Figure 18:
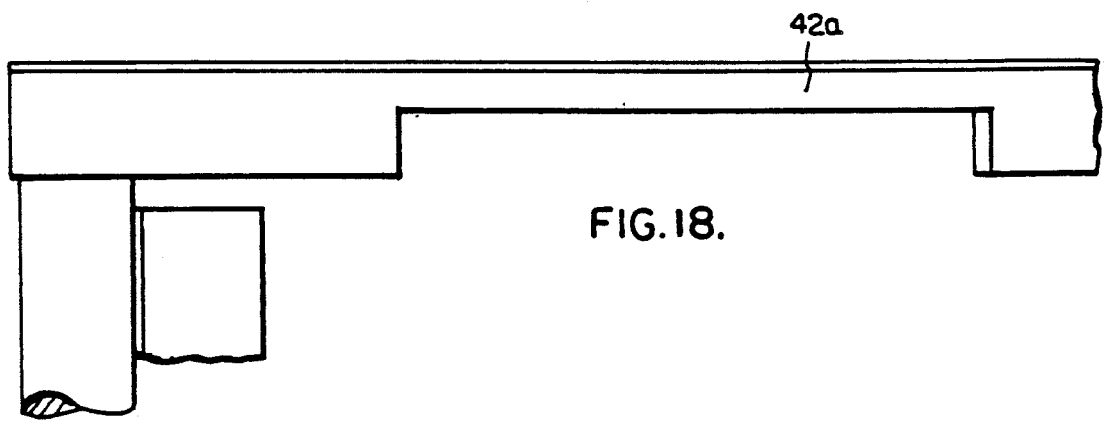

Cable securance to the underside of the car 40 is achieved with the use of a yoke 80 (FIGS. 6, 7 and 11) located near the leftmost end of the car 40. In operation, the yoke is always located to the left of the horizontal sheaves 64LHS and 64HHS. At the rightmost position of the car 40, i.e. when it is located for loading or unloading of the car basket in the containment building 38, the yoke 80 is located to the left of the horizontal sheaves as shown in FIG. 8.

The yoke 80 (FIG. 11) preferably includes a shaft 82 supported from a car frame member 84 and by angle struts 84 and 86 through bracket 88. A yoke cross-piece 90 is supported for slight pivotal movement on the yoke shaft 82 in a horizontal plane so as to provide for equal load sharing by the paired cables secured to pivot arms 93 and 95 at the outer ends of cross-arms 92 and 94. The pivot arms 93 and 95 have a slight vertical offset so that they align respectively with the return cables 64A and 64B from the high and low horizontal sheaves 64HHS and 64LHS.

Figure 12:
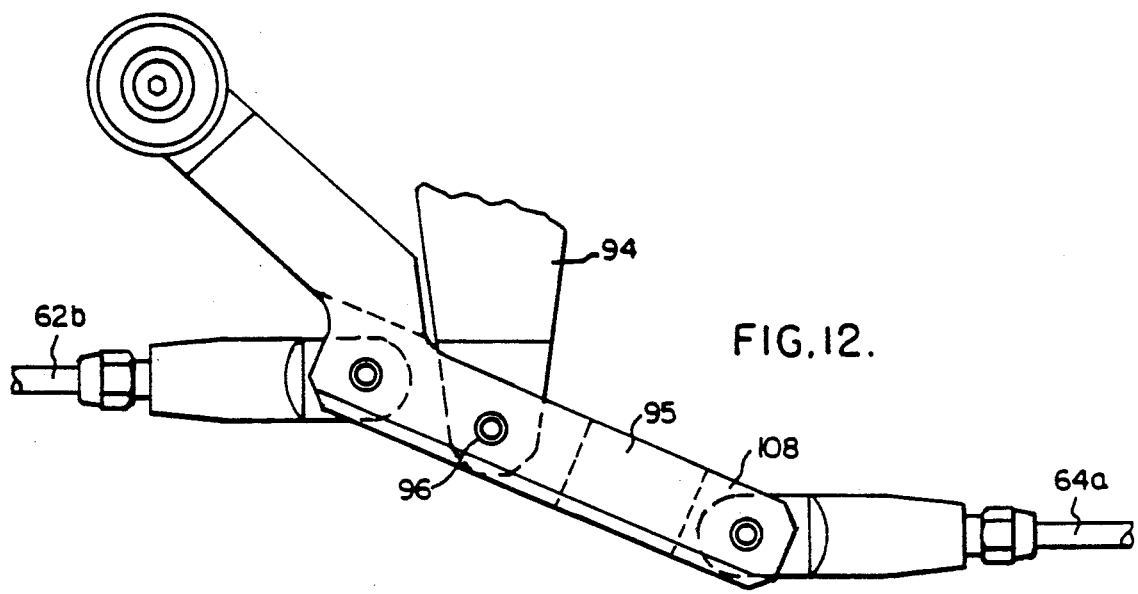
FIGS. 11-13 show various views of a yoke used on the underside of the fuel transfer car for cable hookups.
Figure 13:
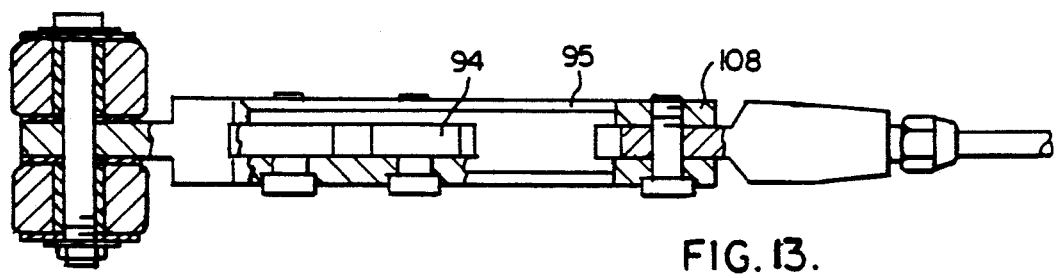

As indicated by the reference character 96, each pivot arm 93 or 95 (FIG. 12) is pivotally supported relative to the yoke cross-arm 92 or 94 to provide cable spreading action when the car 40 is moved to its leftmost position in the auxiliary building for a fuel assembly transfer. In this embodiment, cable spreading action is provided since the horizontal return cables 64A and 64B angle slightly toward the center of the track 42 and thus need to be spread outwardly toward the rails 42A and 42B to assure clearance for upending of a center pivoted car basket as in this case.

Each pivot arm 93 or 95 includes an extension 97 or 99 (FIG. 6) having a roller 100 or 102 at its end. As the car 40 approaches its auxiliary end of travel the two rollers 100 and 102 strike respective fixed spreader blocks 104 and 106 to move toward the center of the track 42. The pivot arms 93 and 95 thus pivot so that end portions 108 and 110 move outwardly toward the rails 42A and 42B thereby spreading the return cables 64A and 64B outwardly as needed for basket upending.

Figure 1B:
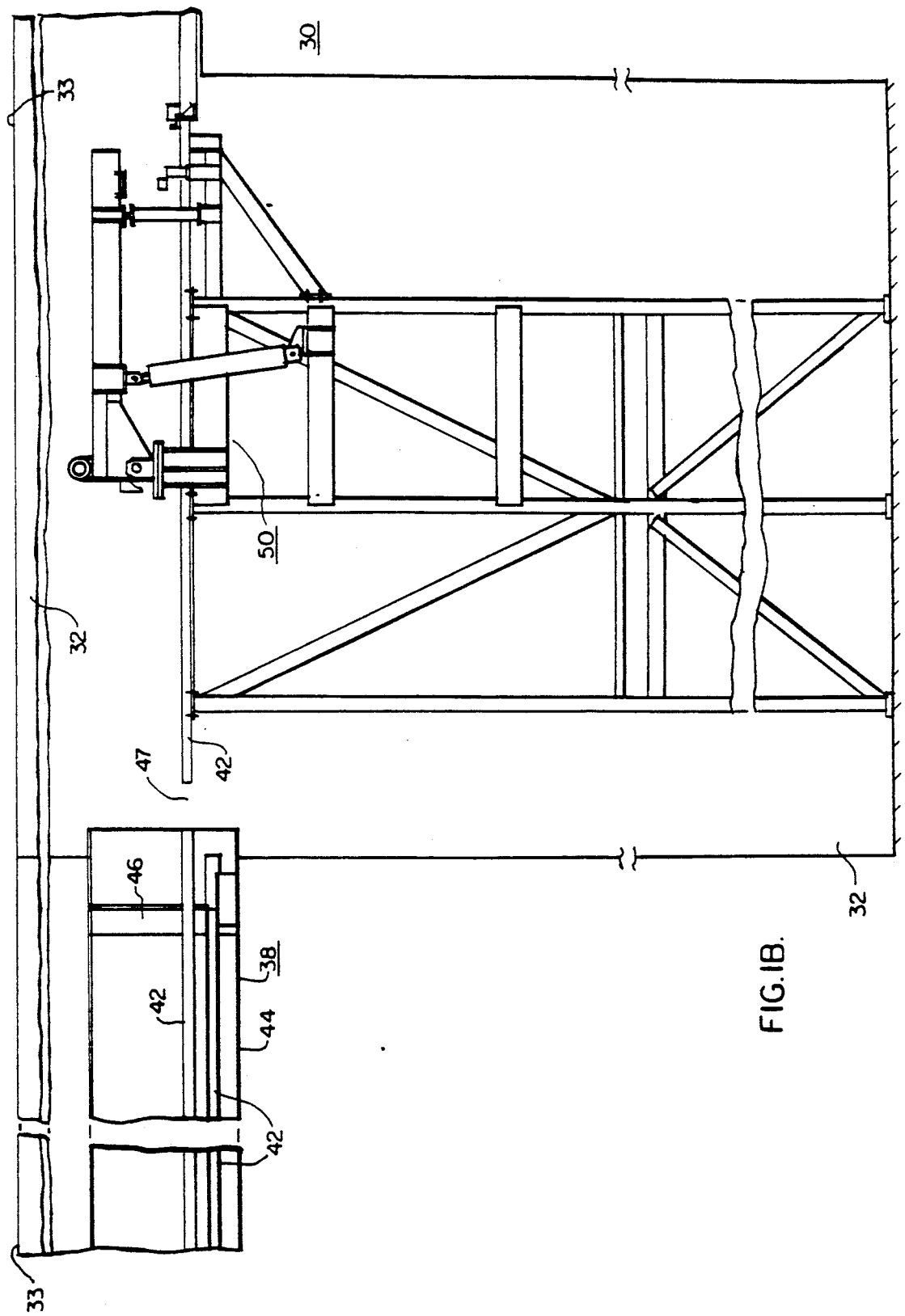
Figure 2A:
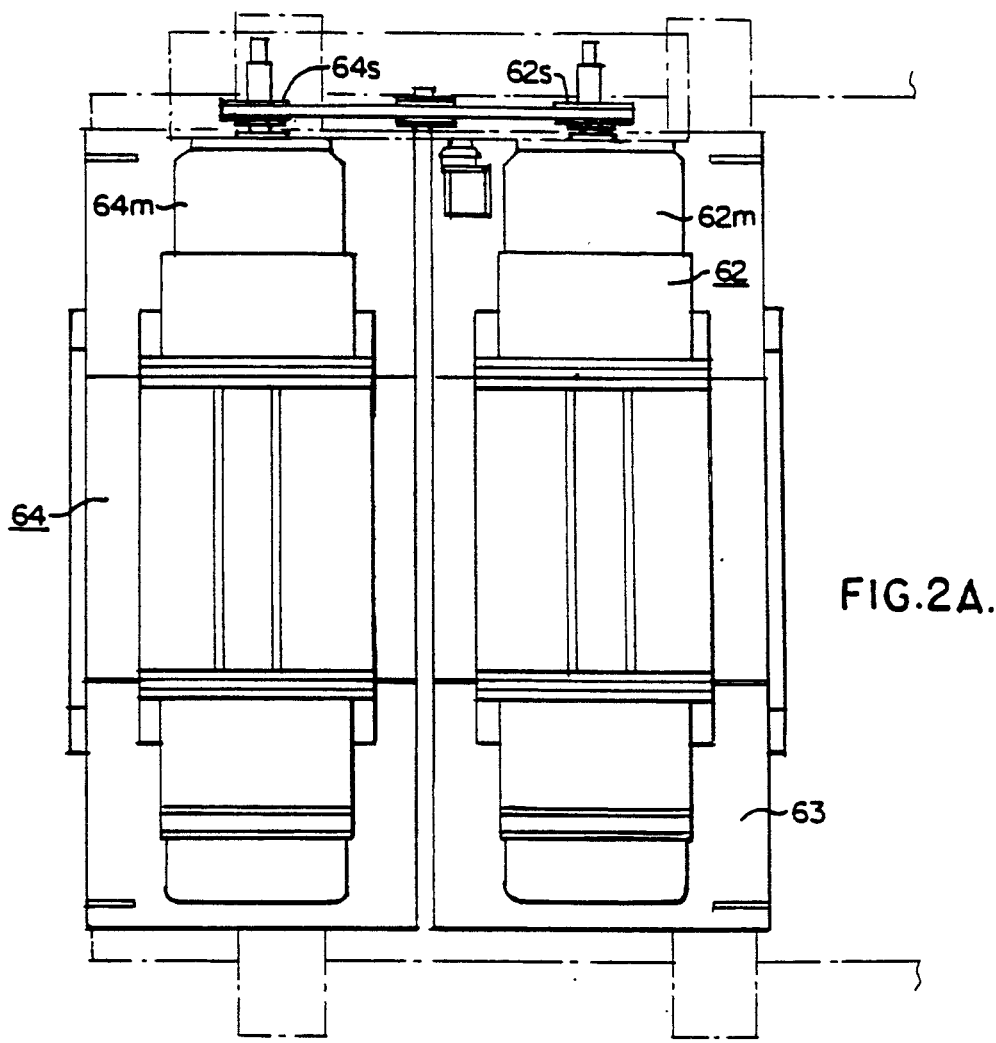
FIGS. 2A-2D show top, elevation and end views of a dual winch drive employed in the FIG. 1 system.
Figure 2B:
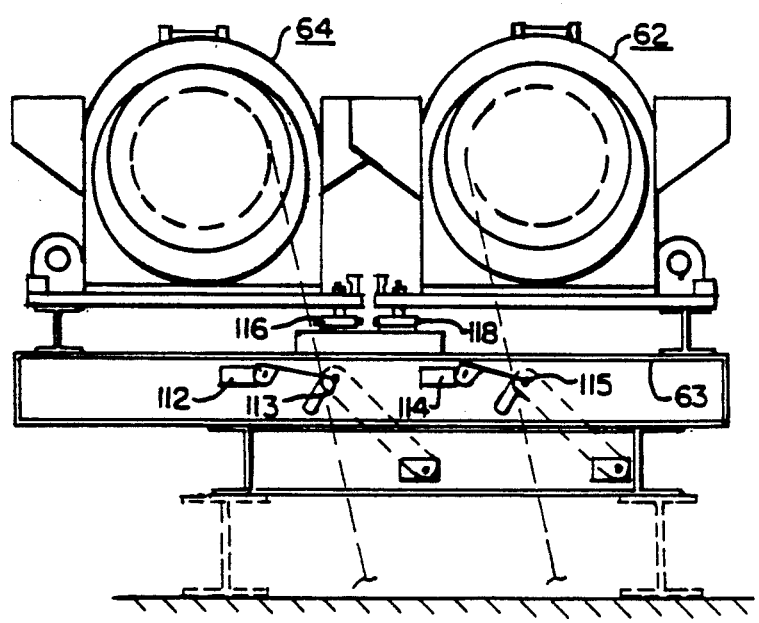
Figure 2C:
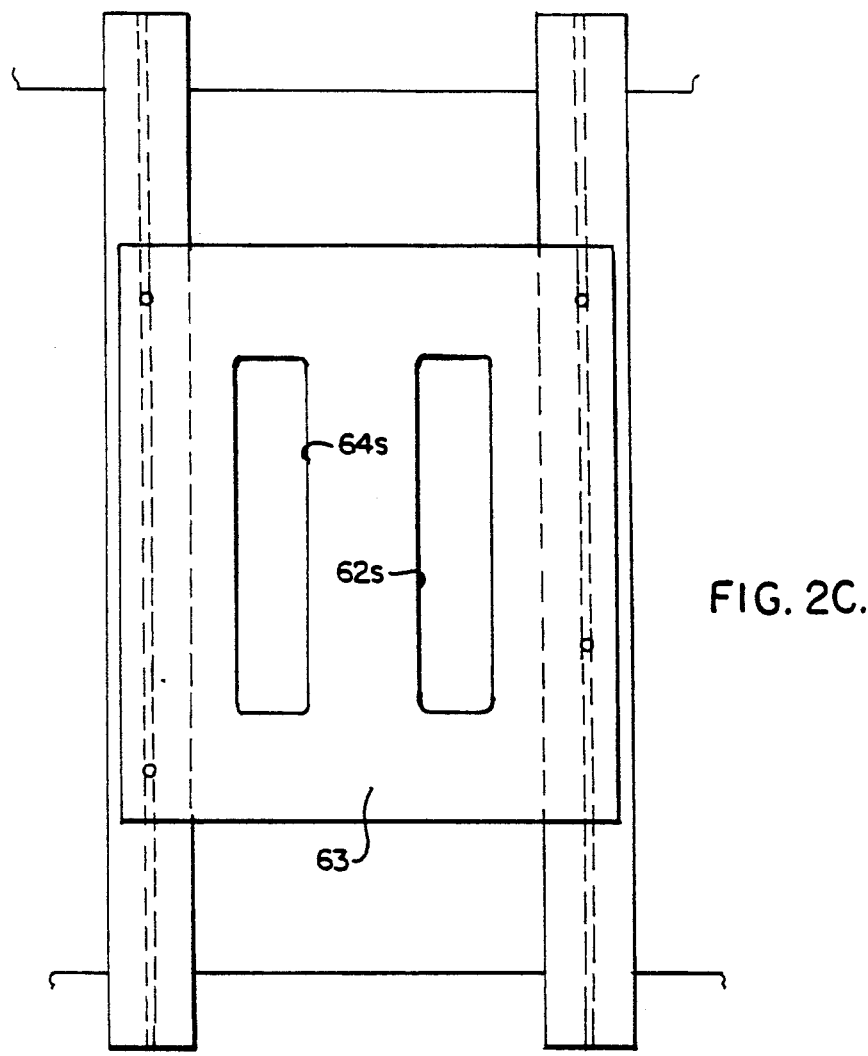
Figure 2D:
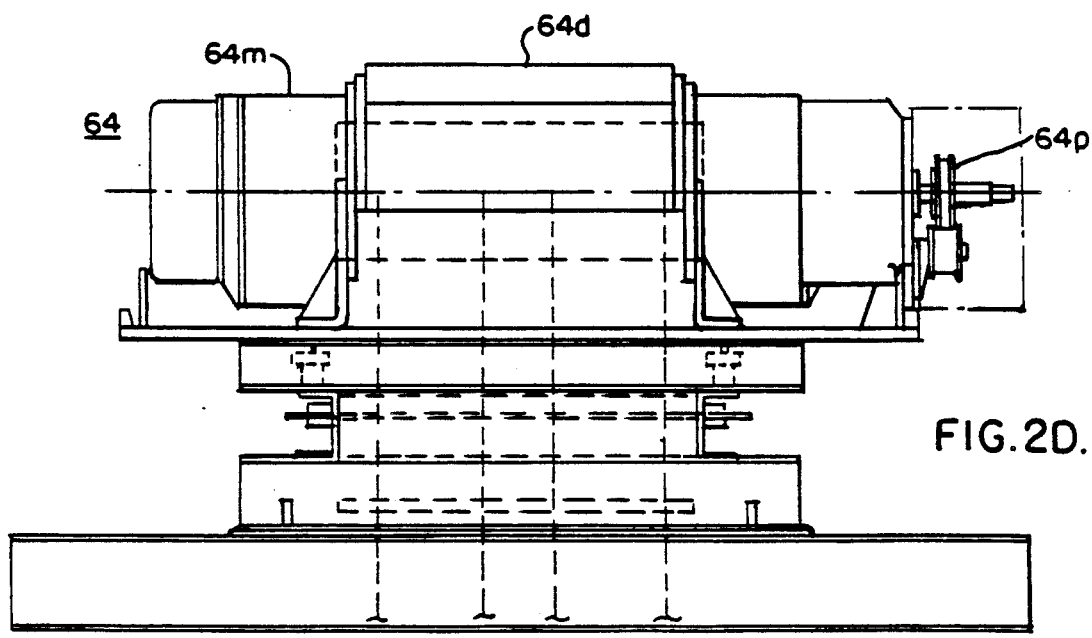
Figure 3:
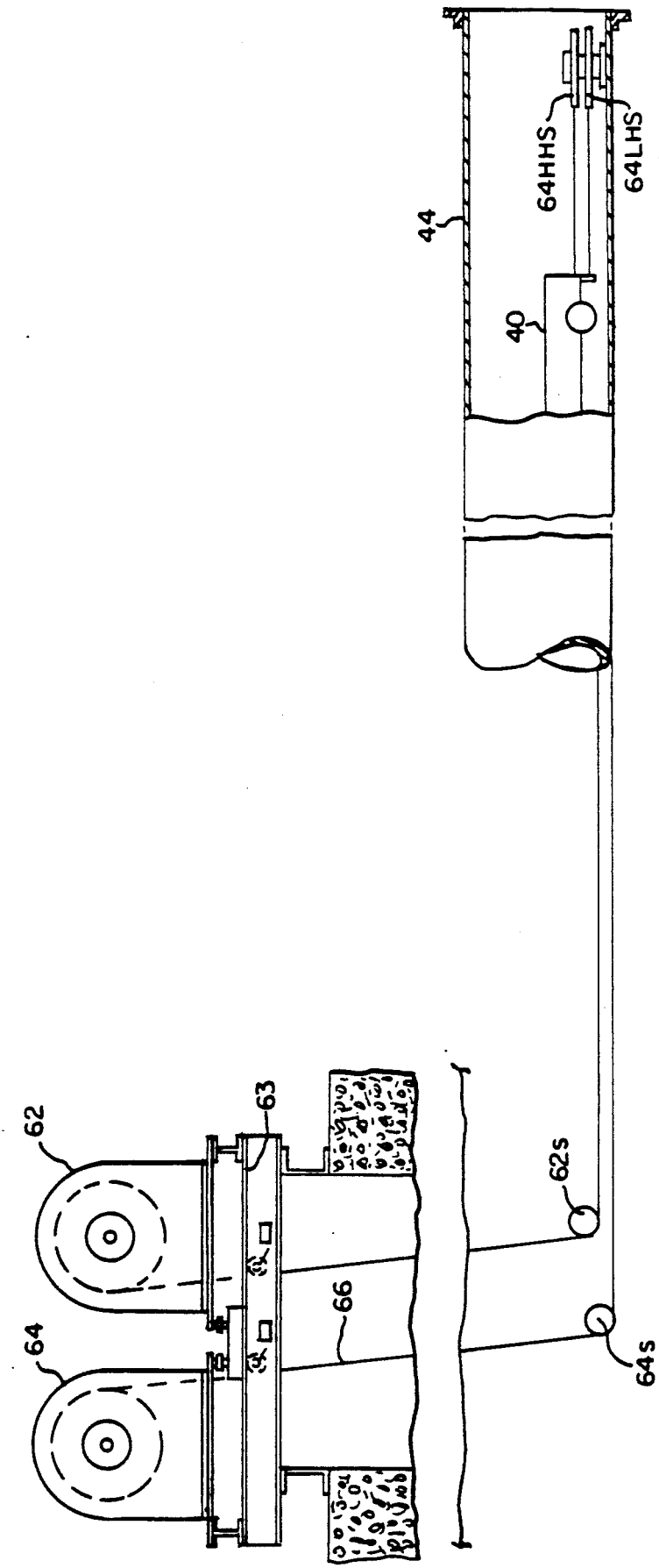

Generally, the track rails 42A and 42B are sufficiently spaced to permit operation of a center pivoted car basket 47 (FIGS. 1A and 6). Additionally, the cables 64A and 64B have portions extending from the vertical sheaves toward the containment, and these are generally sufficiently spread toward the rails 42A and 42B to permit pivotal basket operation within the cable spread space. To this end, various cable guides 64G1 and 64G2 (FIG. 5) secure these portions of the cables 64A and 64B extending from the vertical sheaves to the horizontal sheaves in position toward the track rails.

The return portions of the cables 64A and 64B that extend from the horizontal sheaves to the car yoke generally angle inwardly slightly toward the center of the track. The previously described yoke spreading action pushes these cable portions outwardly toward the track rails 42A and 42B to facilitate center pivoted car basket operation when the car 40 is positioned in the auxiliary building for fuel assembly loading and unloading.

Each winch 62 or 64 preferably includes a drum 62D or 64D and a two speed electric motor 62M or 64M. A timing belt 112 (FIG. 4) is preferably interconnected between sprockets 62S and 64S to coordinate the operation of the winches for continuous maintenance of desired cable tension in the system. Thus, when the designated master drive winch is operating, the braking is released for the other winch and the cable payout from the released winch is held substantially equal to the cable takeup on the master winch as a result of the timing belt tie between the two winch shafts. The timing belt 112 can be released during system initializing to permit relative winch movement until cable tension is adjusted as desired. Idler pulleys 62P (not shown) and 64P (FIG. 2D) compensate for minor variations in cable tension during normal system operation.

Respective slack cable switches 112 and 114 are operated by respective rollers 113 and 115 to deenergize the winches if cable tension is lost and cable slack develops. Respective load cells 116 and 118 sense winch loading and deenergize the winches if overloading develops.

A programmable limit switch 120 (FIG. 5) is employed with one of the winches to provide drive system control. Thus, the switch operates in response to the output of a shaft resolver that in this case counts up to 64 shaft turns with 4096 counts per turn. Since the cable tension is essentially maintained constant, winch shaft position directly indicates the car position.

Accordingly, to move the transfer car from the existing position to another position (usually from one end of travel to the other end of travel) one of the two motor speeds (13 fpm or 40 fpm in this case) is preset and the destination is entered. The limit switch 120 starts the winch motors designating one of them as the master drive and releasing the brake on the other according to the direction of travel and records shaft counts that measure travel distance as the car is pulled by the cabling 66. When the shaft counter indicates that the car has nearly reached its destination position, the programmable limit switch deenergizes the master winch motor and activates the winch braking system. Since the programmable limit switch 120 is located above water, system adjustments are greatly facilitated.

With an actual fuel transfer drive system and its control structured in accordance with the invention as described, a fuel transfer car has been consistently brought to a stop within three sixty-fourths of an inch over a thirty-five foot path of travel. The present invention accordingly provides highly accurate operation. Further, with this drive control arrangement, underwater logic limit switches have been eliminated thereby significantly enhancing system reliability. For example, conventional underwater drive stop limit switches and drive home limit switches are unnecessary with use of the present invention. Just as importantly, reliability is enhanced significantly from a mechanical standpoint as a result of the overall structure and operation of the mechanical portion of the drive system. The structural character of the drive system also provides for economy of manufacture.

What is claimed is:

1. In a nuclear power plant having an auxiliary building, a containment building having the wall, a track extending through a transfer tube within the containment wall, and a fuel transfer system for moving fuel assemblies along the track between the auxiliary building side and the containment building side of the containment wall, said system comprising:

a car having wheels for movement along spaced rails of the track and further having a carrying basket for one or more fuel assemblies;

winch means located on the auxiliary building side of the containment wall and above the water level existing over the track during refueling operations to drive said car along the track;

first cable means and second cable means extending substantially vertically downward from said winch means to the track level;

first sheave means for directing said first and said second cable means substantially in the horizontal direction along the track;

means for securing said first cable means to said car so that winch pulling force on said first cable means drives said car away from the containment building;

second sheave means located near the containment end of the transfer tube;

said second cable means extending substantially horizontally along the track from said first sheave means to said second sheave means where it is redirected to extend substantially horizontally in the reverse direction along the track;

means for securing said second cable means to said car so that winch pulling force on said second cable means drives said car toward the containment building; and means for operating said winch means to pull said cable means so as to move said car selectively between one end position in which said car is within the auxiliary building for fuel assembly loading and unloading and the other end position in which said car is principally located in the containment building with at least a cable securance portion of said car located over the track within the transfer tube and to the auxiliary building side of said second sheave means; and both of said cable securing means located on said cable securance car portion.

2. A fuel transfer system as set forth in claim 1 wherein:

said winch means includes a first electric motor driven winch that operates said first cable means and a second electric motor driven winch that operates said second cable means; and means for coordinating the operation of said winches to maintain desired cable tension.

3. A fuel transfer system as set forth in claim 2 wherein:

each of said winches has a shaft with a sprocket; and said coordinating means includes a timing belt coupling said sprockets.

4. A fuel transfer system as set forth in claim 2 wherein:

idler pulley means additionally operate to provide adjustments for minor cable tension variations.

5. A fuel transfer system as set forth in claim 2 wherein:

load cell means are provided for each of said winches to shut down said winches under overload conditions.

6. A fuel transfer system as set forth in claim 2 wherein:

means are provided for sensing slack cable for each of said cable means to shut down said winches under underload conditions.

7. A fuel transfer system as set forth in claim 1 or 2 or 3 wherein:

said operating means includes a programmable limit switch that responds to winch shaft turns as an indicator of car position and operates said winch means or said winches to drive said car to preselected positions where fuel assembly loading and unloading may be performed.

8. A fuel transfer system as set forth in claim 1 or 2 wherein:

said car includes a center pivoted horizontally disposed basket pivotable to a vertical position in response to upending apparatus when said car is positioned for fuel assembly loading or unloading;

the track rails are sufficiently spaced to permit pivotal motion of said basket with the basket bottom half passing through the plane of the track; and said sheave means and said car cable securing means being disposed so that said second cable means can be generally disposed outwardly toward the track railing and thereby avoid interfering with basket operation.

9. A fuel transfer system as set forth in claim 8 wherein cable guide means are provided for securing said second cable means in position toward the track railing.

10. A fuel transfer system as set forth in claim 7 wherein:
   said first cable means includes first and second cables secured to said car at spaced locations across the car width; and
   said second cable means includes third and fourth cables secured to said car at spaced locations across the car width.

11. A fuel transfer system as set forth in claim 10 wherein:
   said first and second cable securing means includes a yoke secured to the underside of said car;
   said yoke having a crossarm extending generally transversely of the track and having opposite end portions to which all of said cables are secured.

12. A fuel transfer system as set forth in claim 11 wherein:
   said yoke further has a vertically extending shaft on which said crossarm is mounted for pivotal movement for cable loading equalization.

13. A fuel transfer system as set forth in claim 11 wherein:
   said second sheave means includes first and second vertically aligned horizontal sheaves respectively for said third and fourth cables; and
   said opposite end portions of said yoke crossarm being disposed at different vertical positions for alignment with said third and said fourth cables extending thereto from said horizontal sheaves.

14. A fuel transfer system as set forth in claim 13 wherein:
   said first sheave means includes four horizontally aligned vertical sheaves supported generally at the track level between the track rails respectively for said four cables; and
   said third and fourth cables operable respectively over the outer two of said vertical sheaves to facilitate placement of said third and fourth cables toward the rails.

15. A fuel transfer system as set forth in claim 8 wherein:
   each of said yoke end portions includes a pivot arm to which one of said first and second cables and one of said third and fourth cables are secured and being pivotable in a horizontal plane;
   spreader block means disposed at the track level near the auxiliary building car position where fuel assembly loading and unloading occurs; and
   said spreader block means actuating said yoke pivot arms into horizontal movement to spread the ends of said third and fourth cables outwardly toward the track rails to facilitate car basket operation during fuel assembly loading and unloading.

16. A fuel transfer system as set forth in claim 12 wherein:
   said second sheave means includes first and second vertically aligned horizontal sheaves respectively for said third and fourth cables; and
   said opposite end portions of said yoke crossarm being disposed at different vertical positions for alignment with said third and said fourth cables extending thereto from said horizontal sheaves.

17. A fuel transfer system as set forth in claim 10 wherein:
   said first sheave means includes four horizontally aligned vertical sheaves supported generally at the track level between the track rails respectively for said four cables; and
   said third and fourth cables operable respectively over the outer two of said vertical sheaves to facilitate placement of said third and fourth cables toward the rails.

18. A fuel transfer system as set forth in claim 11 wherein:
   each of said yoke end portions includes a pivot arm to which one of said first and second cables and one of said third and fourth cables are secured and being pivotable in a horizontal plane;
   spreader block means disposed at the track level near the auxiliary building car position where fuel assembly loading and unloading occurs; and
   said spreader block means actuating said yoke pivot arms into horizontal movement to spread the ends of said third and fourth cables outwardly toward the track rails to facilitate car basket operation during fuel assembly loading and unloading.

* * * * *